United States Patent
Haimer et al.

(10) Patent No.: US 7,060,951 B2
(45) Date of Patent: Jun. 13, 2006

(54) APPARATUS FOR THE CLAMPING OF A ROTARY TOOL IN A TOOL HOLDER

(75) Inventors: Franz Haimer, Igenhausen (DE); Josef Haimer, Igenhausen (DE); Bernhard Regau, Unterwittelsbach (DE)

(73) Assignee: Haimer GmbH, Hollenbach-Igenhausen (DE)

( * ) Notice: Subject to any disclaimer, the term of this patent is extended or adjusted under 35 U.S.C. 154(b) by 0 days.

(21) Appl. No.: 11/114,416

(22) Filed: Apr. 26, 2005

(65) Prior Publication Data

US 2006/0049180 A1   Mar. 9, 2006

(30) Foreign Application Priority Data

Sep. 7, 2004   (DE)   ............... 20 2004 013 916 U

(51) Int. Cl.
*H05B 6/10* (2006.01)
*C21D 9/08* (2006.01)

(52) U.S. Cl. .................. 219/635; 219/637; 219/643; 148/590

(58) Field of Classification Search ............... 219/635, 219/636, 637, 638, 639, 643, 644; 148/566, 148/562, 590, 591
See application file for complete search history.

(56) References Cited

U.S. PATENT DOCUMENTS

| | | | | |
|---|---|---|---|---|
| 2,791,667 A | * | 5/1957 | Clark et al. | 219/615 |
| 4,017,703 A | * | 4/1977 | Lavins et al. | 219/655 |
| 6,600,142 B1 | * | 7/2003 | Ryan et al. | 219/634 |
| 6,818,872 B1 | * | 11/2004 | Mitamura et al. | 219/635 |
| 6,861,625 B1 | | 3/2005 | Haimer et al. | |
| 2003/0088972 A1 | | 5/2003 | Haimer | |

FOREIGN PATENT DOCUMENTS

| | | |
|---|---|---|
| DE | 102 22 092 A1 | 5/2003 |
| DE | 102 18 292 A1 | 11/2003 |
| WO | WO 01/89758 A1 | 11/2001 |

* cited by examiner

*Primary Examiner*—Daniel Robinson
(74) *Attorney, Agent, or Firm*—Scott D. Wofsy; Edwards Angell Palmer & Dodge LLP

(57) ABSTRACT

To set the length of a rotary tool (1a), to be thermally shrunk in place in a tool holder (7a), by means of an inductive heating device (15a), a setting device is provided with a positioning holder (61) for the rotary tool (1a), this positioning holder (61) being freely displaceable, but lockable, along a guide (35a) and its tool push-in movement into the thermally expanded tool holder (7a) being limited by a stop (71). The rotary tool (1a) bears with its tip (31a) against a stop (43a) of the positioning holder (61). By means of a length-measuring device (39a), the stop (71) limiting the push-in movement can be limited to a position in which the tip (31a) of the rotary tool (1a) is at a predetermined distance from a reference surface (33a) of a holder receptacle (17a), holding the tool holder (7a) during the shrink-fitting operation, or from a corresponding reference surface of the tool holder (7a).

Figure 1:
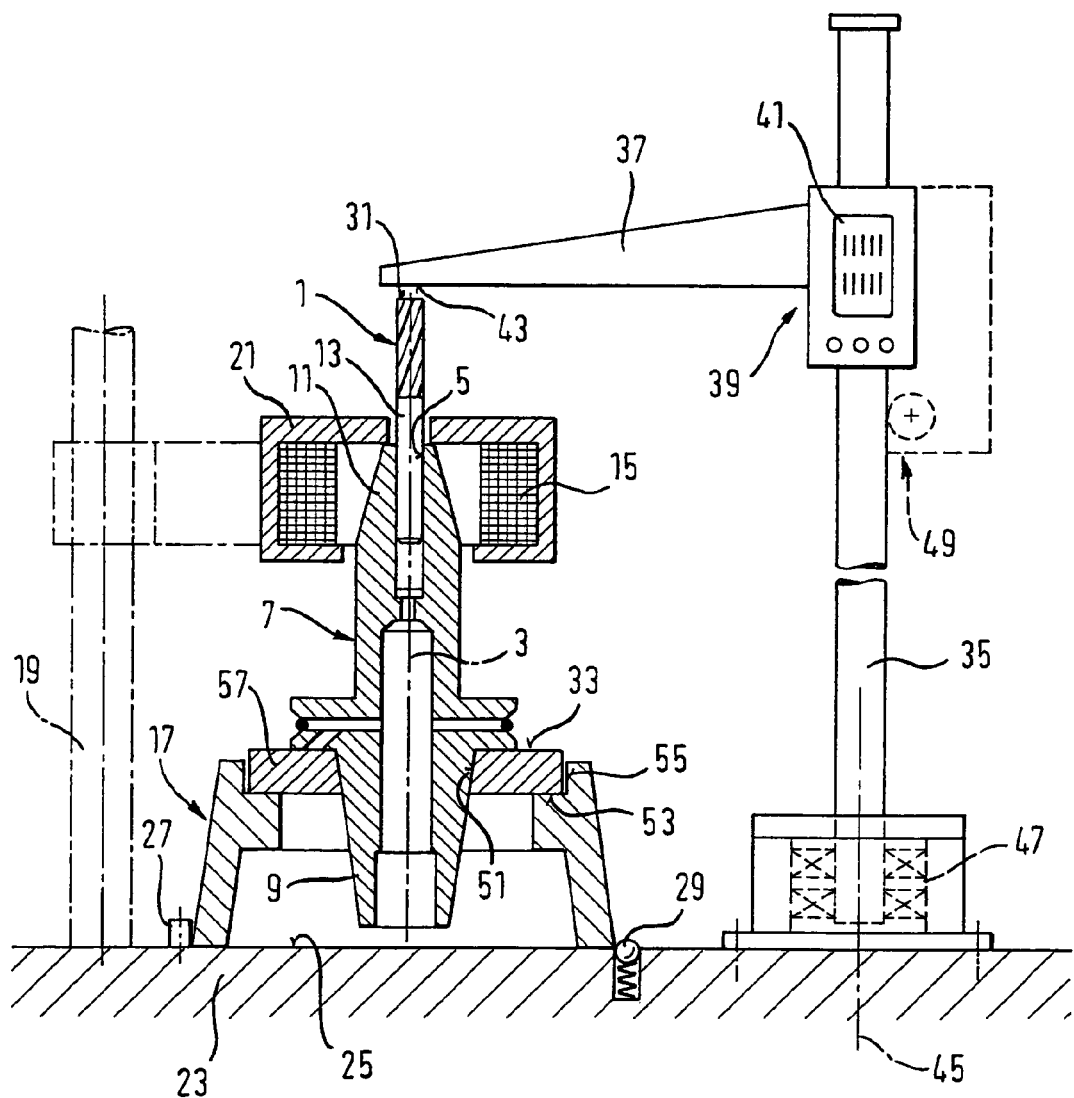

34 Claims, 2 Drawing Sheets

APPARATUS FOR THE CLAMPING OF A ROTARY TOOL IN A TOOL HOLDER

The invention relates to an apparatus for the clamping, in particular the thermal clamping, of a rotary tool, for example a drill or milling cutter or the like, in a concentric locating opening, holding the shank of the rotary tool in an interference fit, of a tool holder.

It is known from WO 01/89758 A to hold rotary tools, such as milling cutters or drills for example, in a concentric locating opening of a tool holder exclusively in an interference fit of a sleeve part, forming the locating opening, of the tool holder. By means of an induction heating device, for example in the form of an induction coil enclosing the sleeve part and fed with alternating current or pulsed direct current, the sleeve part of the tool holder can be heated to such an extent that the shank of the rotary tool can be inserted into or removed again from the locating opening. The outside diameter of the shank is slightly larger than the nominal inside diameter of the locating opening, so that, when the sleeve part has cooled down, the latter holds the shank in an interference fit. In order to accelerate the cooling, cooling collars through which a cooling liquid flows and which can be subsequently put onto the sleeve part of the tool holder are provided.

Conventional tool holders of the above type have a standard coupling, for example a steep-taper coupling or a hollow-shank or HSK coupling, by means of which the tool holder can be coupled to the spindle of the production machine or machine tool. In order to facilitate the tool change, the tip of the rotary tool is to have a predetermined axial position relative to the tool holder and thus relative to the spindle of the production machine. In the case of tool holders of the above type, the rotary tool must be positioned or oriented relative to the tool holder while the sleeve part is thermally expanded.

It is known from DE 102 18 292 A1, in the case of an apparatus which thermally expands the tool holder by means of an induction heating device, to arrange a setting device at the side of the induction coil unit heating the tool holder, this setting device, by means of a stop, which can be moved in front of the locating opening of the tool holder, for the rotary tool, limiting a displacement movement of the rotary tool, displaceably guided in the thermally expanded locating opening, in the removal direction. By means of a length-measuring device assigned to the tool stop, the tool stop displaceable in the axial direction of the rotary tool can be set to a position which corresponds to the desired predetermined position of the tip of the rotary tool relative to the tool holder.

In the apparatus disclosed by DE 102 18 292 A1, the tool holder is connected to a compressed-air source which produces a pneumatic pressure in the tool holder on that side of the rotary tool remote from the tool stop, and this pneumatic pressure drives the rotary tool like a pneumatic plunger against the tool stop adjusted in accordance with the predetermined position. The pneumatic pressure is maintained until the tool holder has sufficiently cooled down and fixes the rotary tool. An additional outlay on constructional elements, which increases the production requirement and thus the production costs, is required for the compressed-air feed and the sealing of the tool holder sitting in a holder receptacle during the heating phase.

From a first aspect, the object of the invention is to specify an apparatus for the thermal clamping of a rotary tool in a tool holder, which apparatus, with simple means, permits rapid pre-setting of the rotary tool relative to the tool holder.

From the first aspect, the invention is based on an apparatus which is disclosed by DE 102 18 292 A1 and which comprises:
  an apparatus base,
  an induction heating device with an induction coil unit for thermally expanding the tool holder for the insertion or/and removal of the rotary tool,
  a holder receptacle holding the tool holder in an axial position during the thermal expansion,
  a device for setting a predetermined axial position of the rotary tool relative to the tool holder, having a stop for the rotary tool, which stop is guided on a guide of the apparatus base in such a way as to be displaceable parallel to the rotation axis of the tool holder held in the holder receptacle and can be deflected along a plane running perpendicularly to the displacement direction of the guide and which, in a first deflection position, limits the removal movement of the rotary tool relative to the tool holder held in the holder receptacle, and releases said movement in a second deflection position, it being possible for the tool stop, in the displacement direction relative to the tool holder or the holder receptacle, to be set to a position corresponding to the predetermined position of the rotary tool.

According to the first aspect of the invention, the above object is achieved in that the induction coil unit, on the one hand, and the stop, on the other hand, are formed in such a way that, when the tool stop is in the first deflection position and while it is located in the position corresponding to the predetermined position, the rotary tool is manually accessible axially between the tool holder and the tool stop for an exclusively manually driven displacement movement in the removal direction.

The time interval in which the induction coil unit inductively heats and thermally expands the tool holder is comparatively short and is normally only a few seconds in order to avoid overheating of the tool holder, which is damaging for the tool holder. On the other hand, it has been found that the tool holder, after the induction heating has been switched off, still remains thermally expanded for a few seconds, on account of its heat capacity, to such an extent that the rotary tool can also be set manually against the tool stop if the latter is pre-set before the start of the thermal-expansion phase in accordance with the desired, predetermined position of the rotary tool. During the thermal-expansion phase, in which the induction heating device is switched on, the tool stop is swung out of the path of movement of the rotary tool, so that the latter, with sufficient thermal expansion of the tool holder, can be inserted into the locating opening quickly and without impairment. After that, the tool stop is swung into the path of movement, and the rotary tool, with the tool holder still thermally expanded, is brought manually into physical contact with the tool stop.

It has surprisingly been found that, in the design of the setting device explained above, even after thermal expansion of the tool holder has been effected and the induction heating device has been switched off, there is still sufficient time to bring the tool stop into the path of movement of the rotary tool and to set the latter against the tool stop before the cooling-down tool holder fixes the rotary tool.

The apparatus according to the invention requires no compressed-air feed. It is sufficient to configure the intermediate space between the tool holder and the tool stop in such a way that the rotary tool can be taken hold of and displaced manually. So that the rotary tool, which is already brought into the vicinity of the tool holder when it is being inserted into the latter, is prevented from being heated at the same time, the induction coil unit preferably comprises a magnetic-flux concentrator which at least partly screens that region of the rotary tool which is situated between the tool stop and the tool holder against the magnetic field of the induction coil unit, a factor which prevents thermal expansion of the rotary tool to be inserted and increases the time interval available for the adjustment of the rotary tool.

Furthermore, it is known from DE 102 22 092 A1 to insert a rotary tool in an automated manner into a tool holder thermally expanded by means of an induction heating device. In this case, the rotary tool is arranged on a positioning holder which is displaceable along a guide and is moved by an actuator against the tool holder heated by an induction coil unit. The positioning holder has a tool stop which establishes the axial position of the rotary tool relative to the positioning holder. A length-measuring arrangement records the length of the rotary tool relative to the tool stop. Apparatuses of the type disclosed by DE 102 22 092 A1 are relatively complicated on account of their inherent automation.

From a second aspect, the object of the invention is to specify a simple apparatus for the manual thermal clamping of a rotary tool in a tool holder, which apparatus permits rapid pre-setting of a desired position of the rotary tool relative to the tool holder.

From the second aspect of the invention, the invention is based on an apparatus of the type disclosed by DE 102 22 092 A1. This apparatus also comprises:

an apparatus base,
a holder receptacle holding the tool holder in an axial position,
a device for setting a predetermined axial position of the rotary tool relative to the tool holder, having a stop for the rotary tool, which stop is guided on a guide of the apparatus base in such a way as to be displaceable parallel to the rotation axis of the tool holder held in the holder receptacle, it being possible for the tool stop, in the displacement direction of the guide relative to the holder receptacle or the tool holder, to be set to a position corresponding to the predetermined position of the rotary tool.

The solution achieving the object according to the invention from the second aspect is characterized in that the setting device has a stop for the tool stop, which stop limits the displacement movement of the tool stop in the push-in direction of the rotary tool relative to the tool holder held in the holder receptacle and can be displaced in the displacement direction in a lockable manner.

In contrast to the apparatus according to the first aspect of the invention, in which the tool stop is pre-adjusted to that position which the rotary tool is to assume later relative to the tool holder, from the second aspect of the invention the stop limiting the push-in movement of the tool stop is pre-set, to be precise in such a way that the tool stop does not have the position corresponding to the desired tool length until after it has run against this stop. To this end, the tool stop is manually displaceable on the guide in a freely movable manner and forms a stop limiting the removal movement of the rotary tool, as has already been explained in connection with the first aspect of the invention, if this tool stop is held in contact with the locked stop.

The tool holder may be a conventional chuck, such as, for example, a collet chuck or another chuck. However, it is preferably a tool holder which can be thermally clamped, as has already been explained above. Here, too, the rotary tool already inserted into the thermally expanded locating opening of the tool holder can be taken hold of manually and set against the tool stop.

In the configurations of the invention which have been explained above, the rotary tool must first be inserted into the thermally expanded locating opening of the tool holder before it can be brought manually up to the tool stop. In a preferred configuration of the invention, the tool stop is arranged on a positioning holder for the rotary tool, and the positioning holder can be displaced together with the tool stop in the displacement direction of the guide. In this variant, the stop explained above, which can be adjusted by means of the setting device, limits the tool push-in movement of the positioning holder in a position in which the tool stop has a position corresponding to the predetermined position of the rotary tool. An advantage of this configuration is that the rotary tool oriented at the positioning holder relative to the locating opening of the tool holder is already inserted into the tool holder in the position established by the tool stop, so that a subsequent, manual removal movement is no longer necessary. In particular, the insertion of the rotary tool may be effected by gravitational force, since the holder stop automatically limits the insertion movement.

From the second aspect, the axial positioning can be carried out quickly and reliably, since both the holder stop can be adjusted before the heating of the tool holder and the positioning holder can be fitted with the rotary tool and be oriented in alignment with the locating opening of the tool holder.

The position of the axially displaceable tool stop according to the first aspect or of the holder stop according to the second aspect can in principle be pre-set by means of a separate measuring device. However, the setting device preferably comprises a length-measuring device whose measuring element displaceable relative to the holder receptacle along the guide forms the tool stop or the holder stop. The length-measuring device may be provided with an indicating device which directly indicates the axial position of the stop relative to a reference surface of the holder receptacle or of the tool holder, so that the stop can be set without any problems to a position which, from both aspects, the tool tip is to assume after the shrink fitting.

The measuring element of the length-measuring device can be manually adjustable. Alternatively, the length-measuring device may also have a positioning drive, in particular a controlled positioning drive which can be set to a selected position setpoint and which shifts the measuring element and thus the tool stop, according to the first aspect, or the holder stop, according to the second aspect, into a position corresponding to the continuously determined position of the rotary tool.

The length-measuring device is also expediently used for checking the shrink-fitting result after the shrink fitting of the rotary tool. The length-measuring device preferably has a data output for length measurement data, so that length deviations determined during the check can be stored in a documentation memory or else accompany the pre-set tool during subsequent production use in a machine tool, so that any deviations which occur can be taken into account in the production machine. To this end, the data output may be connected to a printer or directly to the production machine.

In a preferred configuration, the positioning holder comprises an arm which is displaceable along the guide, projects transversely thereto and carries at its end the tool stop and orientation means for the rotary tool. The orientation means may be designed, for example, like a prismatic support. However, holding sleeves or the like which can be radially expanded and widened are also suitable, in particular if at the same time radial holding forces are exerted on the rotary tool. However, the holding forces may also be produced by additional clamping means which exert radially directed holding forces or clamping forces on the rotary tool.

For the operation of the apparatus, it must be ensured that the rotary tool remains in physical contact with the tool stop during the displacement and the shrink fitting. To this end, clamping means can be assigned to the orientation means and exert a displacement force, directed towards the tool stop, on the rotary tool. The clamping means may be clamping springs or clamping jaws which exert a displacement force component, directed towards the tool stop, on the rotary tool. The clamping means may expediently involve a permanent magnet which pulls the rotary tool, usually made of a magnetic material, such as steel for example, against the tool stop. In order to avoid demagnetization by the induction coil unit, the permanent magnet is preferably designed as a pot magnet accommodated in a ferrite screen.

The tool stop and the positioning holder are expediently provided on an arm projecting transversely from the guide, the arm being swivellable relative to the apparatus base about the displacement direction in order thus to be able to be moved as quickly as possible, during operation of the apparatus, into or out of a position oriented relative to the locating opening of the tool holder. In this case, the arm may be designed to be swivellable relative to the guide, or else the entire guide may be fixed in a swivellable manner on the apparatus base.

The orientation means are preferably guided on the arm in such a way as to be displaceable transversely to the guide along a plane running perpendicularly to the displacement direction of the guide, so that the tool axis, irrespective of the diameter of the rotary tool, can be oriented concentrically to the locating opening of the tool holder.

In the apparatus disclosed by WO 01/89 758 A1, a plurality of holder receptacles are arranged on a rotary table in such a way as to be distributed about its axis of rotation. The tool receptacles fitted with the tool holders can be moved one after the other on the rotary table through the region of the induction coil unit and subsequently through a region in which they can be cooled by means of cooling collars. The rotary table necessitates a relatively large design input, in particular if the tool receptacles guided on it define reference surfaces for the length setting. In a preferred very simple configuration, provision is made for the apparatus base to form a flat essentially horizontal table surface, on which the holder receptacle rests loosely in a freely displaceable manner. The precision-machined table surface permits exact, reproducible measurement of the reference positions of the tool holder or the holder receptacle without it being necessary for the holder receptacle to be positioned in an exactly reproducible manner for this purpose. The tool receptacles can also be displaced without any problems between the various working regions of the apparatus without a rotary table or the like having to be provided.

In order to facilitate the orientation of the holder receptacles, displaceable along the table surface, relative to the induction coil unit, two stops, if appropriate in the form of a prismatic guide, are preferably provided on the table surface, and the table-surface-side region, contoured in a circular shape, of the holder receptacle can be pushed with a circumferential segment in between these stops. However, the holder receptacle is preferably latched in this position in order to avoid unintentional displacement. To this end, for example, a permanent magnet may be provided on the apparatus base, this permanent magnet interacting in a fixing manner with a magnetizable counterpart of the holder receptacle. In an especially simple configuration, however, provision is made for at least three stops fixing the holder receptacle between them to project beyond the table surface at a distance from one another on a circle, concentric to the induction coil unit, about the circular outer contour of the holder receptacle, of which stops two are rigid and at least one can be elastically deflected transversely to the table surface. The deflectable stop forms a latching element, which can be overcome during the displacement movement of the holder receptacle.

During operation of the apparatus, the setting device must be set to zero relative to a reference surface of the tool holder, but usually relative to a reference surface of the holder receptacle. Since the tool receptacles have to be adapted to different standard couplings of tool holders, it has already been proposed to retain the tool receptacle in each case and to select for the adaptation a respective adapter from a set of adapters which satisfy the various standard couplings. However, the use of conventional adapters leads to a change in the reference plane, so that the length-measuring device has to be set to zero again when the adapter is changed. In a preferred configuration avoiding this disadvantage, provision is therefore made for the holder receptacle, on its top side, to have a centring opening for the concentric fixing of an adapter intended for accommodating a tool holder, the centring opening being adapted to a plurality of adapters of different tool holders, and for each of the adapters to which the centring opening is adapted to have on its top side a reference surface which is parallel to the table surface and whose distance from the table surface, when an adapter is inserted into the centring opening, is the same for the adapters to which the centring opening is adapted.

Figure 2:
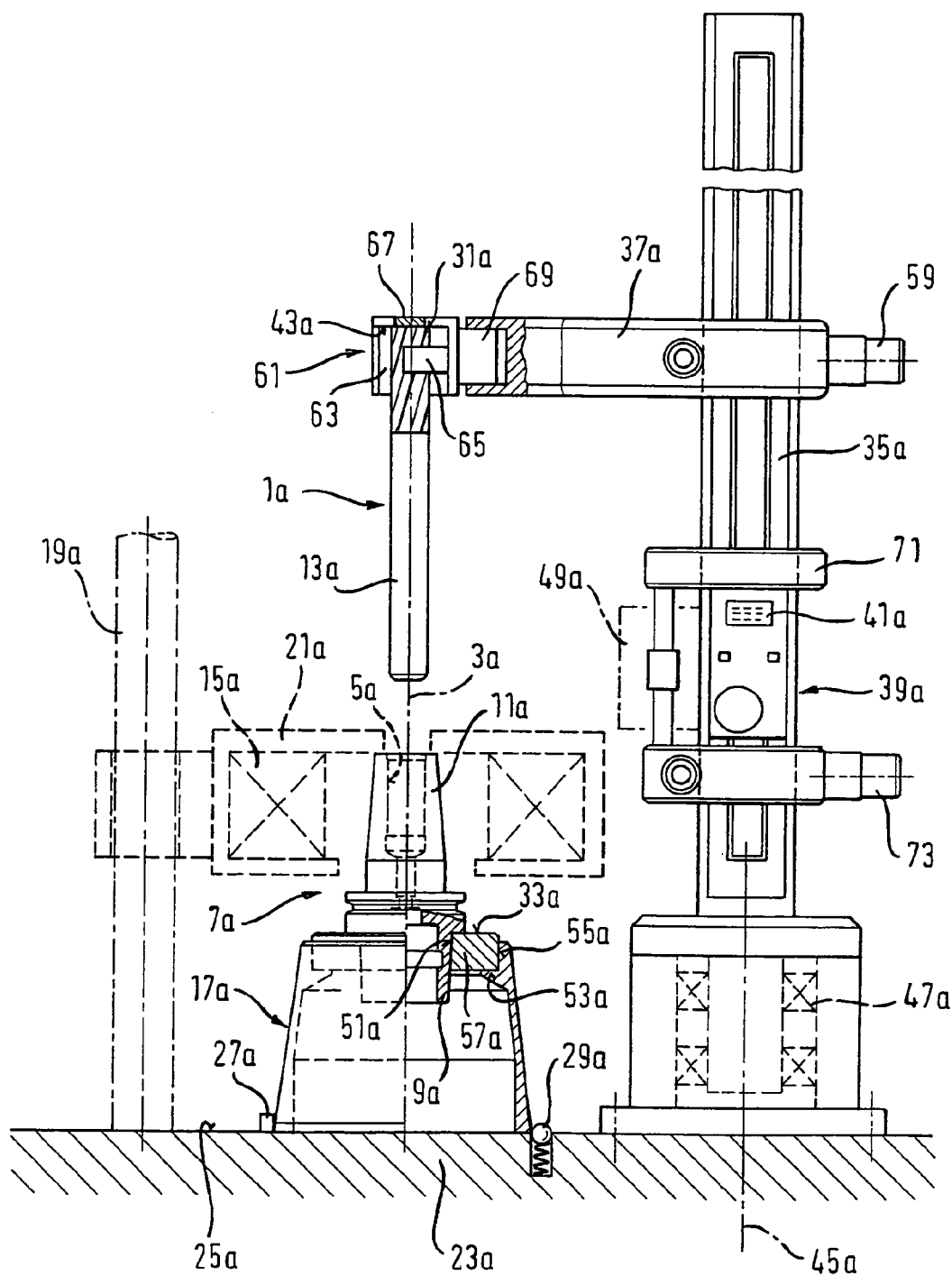

The invention is explained in more detail below with reference to a drawing, in which:

FIG. 1 shows a partly sectioned side view of an inductive shrink-fitting apparatus with a length-setting device, and FIG. 2 shows a partly sectioned side view of a variant of the shrink-fitting apparatus.

FIG. 1 shows a partial view of an inductive shrink-fitting apparatus with which a rotary tool 1, for example a drill or milling cutter, can be releasably clamped in a locating opening 5, concentric to the rotation axis 3, of a tool holder 7. The tool holder 7 comprises a standard coupling 9 for connection to a machine spindle of a production machine or machine tool (not shown in any more detail). The standard coupling may be a steep-taper coupling or a hollow shank (HSK) coupling or the like. Axially remote from the standard coupling 9, a sleeve part 11 projects from the tool holder 7, this sleeve part 11 containing the locating opening 5 and holding the shank 13 of the tool 1 in a rotationally fixed manner in an interference fit.

The shrink-fitting apparatus comprises an induction coil 15 which is fed with alternating current or pulsed direct current, encloses the metallic sleeve part 11 during the clamping operation and induces eddy currents in the sleeve part 11 by transformation, these eddy currents thermally expanding the sleeve part 11 to such an extent that the shank 13 of the tool 1 can be inserted into or removed from the locating opening 5. Since the diameter of the shank 13 is slightly larger than the nominal diameter of the locating opening 5, it is held in an interference fit in the locating opening 5 after the cooling of the sleeve part 11.

For the thermal clamping operation, the tool holder 7 sits with vertical axis 3 and sleeve part 11 directed upwards in a holder receptacle 17 holding the standard coupling 9 in such a way as to be positioned both axially and radially. The induction coil 15 is guided on a guide 19 in a vertically displaceable and lockable manner, so that it can be placed concentrically onto the sleeve part 11 from above. Annular-disc-shaped pole shoes of a magnetic-flux concentrator 21 are arranged axially on both sides of the induction coil 15 and are connected to the circumference of the induction coil 15 via a yoke. The magnetic-flux concentrator 21 is made of a ferritic material or another magnetically conductive, electrically nonconductive material and concentrates the magnetic field of the induction coil 15 on the sleeve part 11. In addition, the magnetic-flux concentrator 21 magnetically screens that region of the tool 1 that projects upwards beyond the sleeve part 11, so that this region does not heat up or heats up only slightly. Further details of a conventional shrink-fitting apparatus of this type are described in WO 01/89758 A1. It goes without saying that not only is an induction coil which is concentric to the rotation axis 3 suitable, but induction coil arrangements which produce a magnetic field directed in the circumferential direction of the sleeve part 11 are also suitable.

In the example shown in FIG. 1, the tool holder 7 is inductively heated for the thermal expansion of its locating opening 5. After the insertion or removal of the tool 1, the holder receptacle 17 fed with the heated tool holder 7 is transferred to a region in which the tool holder 7 can cool down, but in which it is, however, force-cooled, as explained, for example, in WO 01/89758 A1 with reference to cooling collars fed with a cooling fluid. In order to be able to displace the holder receptacles 17 between the various working regions of the apparatus, the apparatus has a plate 23 forming the apparatus base and having a horizontal, precisely flat-machined table surface 25, on which the loosely supported holder receptacle 17 can be manually displaced. Two fixed stops 27 and at least one but preferably two spherical latching stops 29, which can be pressed in transversely to the table surface 25 in a spring-loaded manner, project from the table surface 25. The stops 27, 29 are arranged at a distance from one another on a circle which is concentric to the induction coil 15 and which likewise encloses the circular outer contour of the foot region of the holder receptacle 17. The stops 27, 29 permit defined positioning of the locating holder concentrically to the induction coil 15, the holding force of which can be overcome by pressing in the latches 29 when displacing the holder receptacle 17. It goes without saying that positioning stops of the type explained can also be arranged in other regions of the apparatus, for example in the region intended for the cooling.

In order to be able to exchange rotary tools in the production machine in a reproducible manner, the tip 31 of the rotary tool 1 is to have a predetermined axial position with regard to the tool holder 7 and in particular its standard coupling 9. To this end, the rotary tool 1, during the shrink-fitting operation, is axially positioned relative to the tool holder 7 in such a way that the tip 31 has a predetermined position relative to a reference surface 33 of the holder receptacle 17 and thus a predetermined position relative to the standard coupling 9. In order to be able to set this predetermined position, a vertical guide column 35 is set up on the plate 23 forming the apparatus base, and a measuring element which can be displaced along the guide column 35 in the form of an arm 37 of a length-measuring device 39 can be displaced on this guide column 35. The length-measuring device 39 comprises an indicating display 41, which can be set to zero at the reference surface 33 of the holder receptacle 17 or at another reference surface, in particular of the tool holder 7. The arm 37 overlaps the tip 31 of the rotary tool 1 and forms in this region a stop 43 which limits the removal movement of the rotary tool 1. The arm 37 is displaceable on the guide column 35 parallel to the rotation axis 3 and can be swivelled together with the guide column 35 about a rotation axis 45 parallel to the displacement direction between a first swivelled position, in which the stop 43 overlaps the tool tip 31, and a non-overlapping swivelled position, in which the rotary tool can be inserted into or removed from the locating opening 5 by the arm 37 without impairment. The guide column 35 is mounted precisely on the plate 23 by means of a prestressed ball bearing 47. It goes without saying that the guide column 35 can also be rigidly attached to the plate 23, if the arm 37 is instead mounted on the guide column 35 in a swivellable manner. If need be, the length-measuring device 39 including its guide column 35 can be retrofitted on a conventional shrink-fitting apparatus.

In order to shrink the rotary tool 1 in place in a predetermined position in the tool holder 7, first of all the induction coil 15 is brought into its heating position surrounding the sleeve part 11, the arm 37 of the length-measuring device 39 to begin with still being set at the side of the tool holder 7 to a position of its stop 43 which corresponds to the predetermined position. To this end, first of all the length-measuring device 39 is set to zero with the stop 43 bearing against the reference surface 33, whereupon the arm is then shifted along the guide column 35 into the position indicated on the display 41 and corresponding to the predetermined position and is locked there. After that, the induction heating device is switched on until the sleeve part 11 has heated up to such an extent that the shank 13 of the rotary tool 1 can be inserted into the locating opening 5. During the heating phase or just after it, the arm 37 is swivelled over the rotary tool 1, so that the stop surface 43 overlaps the tool tip 31. The rotary tool 1 is then taken hold of manually and lifted to such an extent that the tip 31 bears against the stop 43. In this position, the rotary tool 1 is held manually for a few seconds until the cooling-down sleeve part 11 adequately fixes the shank 13. The arm 37 narrows towards the stop 43, and the induction coil 15 including the magnetic-flux concentrator 21 ends essentially flat at a small distance from the tool-side front face of the sleeve part 11, so that sufficient intermediate space for manually taking hold of the rotary tool 1 remains between the induction coil 15 and the arm 37. Since the arm 37 can be swivelled in a pre-positioned manner into its position overlapping the tip 31 of the rotary tool 1, a few seconds are sufficient in order to be able to manually set the rotary tool 1 in the predetermined position relative to the tool holder 7.

In a variant of the length-measuring device 39, an actuator, for example a rack-and-pinion actuator, as indicated at 49, is assigned to the arm 37, and this actuator adjusts the arm 37 and thus the stop 43 along the guide column 35. The actuator 49 may in particular be part of a positioning drive which regulates the stop 43 to a selected position setpoint.

The holder receptacle 17 holds the standard coupling 9 of the tool holder 7 in a locating opening 51 adapted to the shape and size of this coupling. In order to be able to adapt the holder receptacle 17 to different tool holders 7, it has on its top side a concentric centring opening 55 closed at the bottom by a shoulder 53 and intended for accommodating a disc-shaped adapter 57 which forms the locating opening 51 and whose top surface forms the reference surface 33. The adapters 57 adapted to the different tool holders 7 are designed in such a way that the distance of the reference surface 33 from the table surface 25, when the adapter 57 is inserted into the centring opening 55, is the same for all the adapters 57 assigned to the holder receptacle 17. This has the advantage that, after the adapter 57 has been changed, the length-measuring device 39 does not need to be set to zero again by placing the stop 43 against the reference surface 33.

FIG. 2 shows a variant of the apparatus explained with reference to FIG. 1. Components having the same effect are provided with the reference numerals of FIG. 1 and with the letter a for differentiation. For explanation of the construction, the functioning and possible variants, reference is made to the description of FIG. 1. The components 1 to 57 are also present in the variant in FIG. 2.

The variant in FIG. 2 differs from the embodiment in FIG. 1 essentially by the fact that the arm 37a is freely displaceable along the guide column 35a but can be fixed by means of a locking device 59 and, at its end forming the tool stop surface 43a, carries a positioning holder 61 for that end of the rotary tool 1a which forms the tool tip 31a. The positioning holder 61 has a prismatic support 63, which orients the rotary tool 1a in an axially parallel manner to the axis 3a of the tool holder 7a, and fixing means 65, for example in the form of a radially spring-loaded jaw 65 pressing the rotary tool 1a radially into the opposite prismatic support 63. A permanent magnet 67 arranged in the region of the stop 43a pulls the tip 31a of the rotary tool 1a into physical contact with the stop 43a. The positioning holder 61 is displaceably guided on the arm 37a perpendicularly to the displacement direction of the guide column 35a by means of a pin guide 69 or the like, so that the rotary tool 43a, if need be while swivelling the arm 37a about the rotation axis 45a of the guide column 35a, can be oriented coaxially to the locating opening 5a of the tool holder 7a.

The displacement movement of the arm 37a is limited in the tool push-in direction by a stop 71 which is displaceable along the guide column 35a and whose position relative to the reference surface 33a of the holder receptacle 17a can be set to a defined value by means of the length-measuring device 39a. The stop 71 can be locked relative to the guide column 35a by means of a locking device 73. The stop 71 is set in such a way that the stop 43a of the arm 37a bearing against the stop 71 has that position relative to the reference surface 33a which the tip 31a of the rotary tool 1a is to have after the shrink fitting in the tool holder 7a. In this variant, too, the length-measuring device 39a is set to zero by placing the stop 43a against the reference surface 33a.

To shrink fit the rotary tool 1a in the predetermined position, first of all the induction coil 15a is put onto the sleeve part 11a of the tool holder 7a inserted in the holder receptacle 17a, and, on the one hand, the stop 71 is adjusted by means of the length-measuring device 39a to a position corresponding to the predetermined position of the tip 31a and is locked. On the other hand, the rotary tool 1a is inserted into the positioning holder 61 and is set with its tip 31a against the stop 43a. After the heating of the tool holder by means of the induction coil 15a, the arm 37a, with positioning holder 61 oriented concentrically to the locating opening 5a, is lowered down to the stop 71, as a result of which the shank 13a is pushed into the sleeve part 11a. The push-in movement is expediently effected on the basis of the gravitational force. It is sufficient to initially orient the bottom end of the tool shank 13a relative to the locating opening 5a. After the initial cooling of the sleeve part 11a, the shank 13a is fixed in the tool holder 7a, and the arm 37a as well as the induction coil 15a can be lifted upwards. The holder receptacle 17a can then be shifted into the cooling region of the apparatus, where a collar through which cooling medium flows can be put onto the sleeve part 11a.

The positioning holder 61, instead of the prismatic receptacle 63 and the clamping jaw 65, may also have other retainers centering in an axially parallel manner, for example like a centring collet or the like. Instead of the permanent magnet 67, provision may also be made for the clamping jaw 65 to exert not only radial clamping forces but also pushing forces, directed axially relative to the stop 43a, on the rotary tool 1a.

In a variant of the apparatus shown in FIG. 2, this variant not being shown in any more detail, the positioning holder 61 may also be dispensed with, so that only the tool stop 43a remains on the arm 37a. The length of the rotary tool 1a is then set as already explained with reference to FIG. 1.

It goes without saying that the length-measuring device 39a may also be equipped with a positioning drive 49a in order thus to displace the stop 71 to the desired position in a controllable manner.

The length-measuring devices explained with reference to FIGS. 1 and 2 can also be used for checking the length setting of the tool holder by the tool stops 43 and 43a, respectively, being placed against the tip of the rotary tool again after the cooling of the tool holder and by the length actually achieved being measured by means of the length-measuring devices 39 and 39a, respectively. The length-measuring devices 39, 39a may have a data output, via which the result of the check measurement is documented, for example is put into paper form by means of a printer or else, for the operation of the tool holder, is fed directly to the production machine, for example an NC machine, which in this way can take into account any possible deviations from the predetermined length value.

In the variants explained above, the tool stop can be swivelled about the displacement direction of the guide. It goes without saying that the tool stop and, if appropriate, the positioning holder, may also be guided in such a way as to be adjustable radially relative to the displacement direction of the guide in order to be able to be moved into or out of the path of movement of the rotary tool. Finally, consideration may also be given to designing the arm on which the tool stop is held in such a way that it can be swung upwards for this purpose.

The invention claimed is:
1. Apparatus for the thermal clamping of a rotary tool in a concentric locating opening, holding the shank of the rotary tool in an interference fit, of a tool holder, comprising:
 a) an apparatus base;
 b) an induction heating device with an induction coil unit for thermally expanding the tool holder for the insertion or/and removal of the rotary tool;
 c) a holder receptacle holding the tool holder in an axial position during the thermal expansion; and
 d) a device for setting a predetermined axial position of the rotary tool relative to the tool holder, having a stop for the rotary tool, which stop is guided on a guide of the apparatus base in such a way as to be displaceable parallel to the rotation axis of the tool holder held in the holder receptacle and can be deflected along a plane running perpendicularly to the displacement direction of the guide and which, in a first deflection position, limits the removal movement of the rotary tool relative to the tool holder held in the holder receptacle, and releases said movement in a second deflection position, it being possible for the tool stop, in the displacement direction relative to the tool holder or the holder receptacle, to be set to a position corresponding to the predetermined position of the rotary tool, wherein the induction coil unit, on the one hand, and the tool stop, on the other hand, are formed in such a way that, when the tool stop is in the first deflection position and while it is located in the position corresponding to the predetermined position, the rotary tool is manually accessible axially between the tool holder and the tool stop for an exclusively manually driven displacement movement in the removal direction.

2. Apparatus according to claim 1, wherein the setting device comprises a length-measuring device whose measuring element displaceable relative to the holder receptacle along the guide forms the tool stop.

3. Apparatus according to claim 2, wherein the measuring element can be displaced manually into the position corresponding to the predetermined position of the rotary tool.

4. Apparatus according to claim 2, wherein the measuring element can be displaced by means of a controllable positioning drive into a position corresponding to the predetermined position of the rotary tool.

5. Apparatus according to claim 1, wherein the tool stop is formed on the free end of an arm displaceable along the guide and projecting transversely to the guide.

6. Apparatus for the clamping of a rotary tool in a concentric locating opening, holding the shank of the rotary tool in an interference fit, of a tool holder, comprising:
   a) an apparatus base;
   b) a holder receptacle holding the tool holder in an axial position; and
   c) a device for setting a predetermined axial position of the rotary tool relative to the tool holder, having a stop for the rotary tool, which stop is guided on a guide of the apparatus base in such a way as to be displaceable parallel to the rotation axis of the tool holder held in the holder receptacle, it being possible for the tool stop, in the displacement direction of the guide relative to the holder receptacle or the tool holder, to be set to a position corresponding to the predetermined position of the rotary tool,
wherein the setting device has a stop for the tool stop, which stop limits the displacement movement of the tool stop in the push-in direction of the rotary tool relative to the tool holder held in the holder receptacle and can be displaced in the displacement direction in a lockable manner.

7. Apparatus according to claim 6, wherein the tool stop is arranged on a positioning holder for the rotary tool, which holds the rotary tool in a removable manner coaxially to the rotation axis of the tool holder held in the holder receptacle, the tool stop establishing the axial position of the rotary tool relative to the positioning holder, and in that the positioning holder is displaceable together with the tool stop in the displacement direction of the guide, and the stop limits the tool push-in movement of the positioning holder in a position in which the tool stop has a position corresponding to the predetermined position of the rotary tool.

8. Apparatus according to claim 6, wherein for the thermal clamping of the rotary tool, it has a heating device, in particular an induction heating device with an induction coil unit, for thermally expanding the tool holder for the insertion or/and removal of the rotary tool, and the holder receptacle holds the tool holder in an axial position during the thermal expansion.

9. Apparatus according to claim 6, wherein the setting device comprises a length-measuring device whose measuring element displaceable relative to the holder receptacle along the guide forms the holder stop.

10. Apparatus according to claim 9, wherein the measuring element can be displaced manually into the position corresponding to the predetermined position of the rotary tool when the positioning holder bears against the holder stop.

11. Apparatus according to claim 9, wherein the setting device has a positioning drive displacing the measuring element in a controlled manner into the position corresponding to the predetermined position of the rotary tool when the tool stop bears against the holder stop.

12. Apparatus according to claim 11, wherein the positioning drive is designed as a controlled positioning drive which can be set to a selected position setpoint.

13. Apparatus according to claim 9, wherein the length-measuring device has a data output for length measurement data.

14. Apparatus according to claim 7, wherein the positioning holder comprises an arm which is displaceable along the guide, projects transversely thereto and carries at its end the tool stop and orientation means for the rotary tool.

15. Apparatus according to claim 14, wherein the orientation means comprise at least one prismatic support.

16. Apparatus according to claim 14, wherein the orientation means are guided on the arm in such a way as to be displaceable transversely to the guide along a plane running perpendicularly to the displacement direction of the guide.

17. Apparatus according to claim 14, wherein clamping means are assigned to the orientation means and exert a displacement force, directed towards the tool stop, or/and a holding force, directed transversely to the rotation axis, on the rotary tool.

18. Apparatus according to claim 17, the clamping means comprise a permanent magnet arranged on the tool stop.

19. Apparatus according to claim 1, wherein the guide is rotatably mounted about its longitudinal direction on a foot fastened to the apparatus base.

20. Apparatus according to claim 1, wherein the arm can be swivelled about the displacement direction of the guide.

21. Apparatus according to claim 1, wherein the apparatus base forms a flat essentially horizontal table surface, on which the holder receptacle rests loosely in a freely displaceable manner.

22. Apparatus according to claim 21, wherein the holder receptacle has a circular outer contour, at least in its region facing the table surface, and in that at least three stops fixing the holder receptacle between them project beyond the table surface at a distance from one another on a circle, concentric to the induction coil unit, about the outer contour of the holder receptacle, of which stops two are rigid and at least one can be elastically deflected transversely to the table surface.

23. Apparatus according to claim 21, wherein a cooling device for the tool holder held in the holder receptacle is provided offset along the table surface, the holder receptacle being displaceable along the table surface in the vicinity of this cooling device.

24. Apparatus according to claim 21, wherein the holder receptacle, on its top side, has a centring opening for the concentric fixing of an adapter intended for accommodating a tool holder, the centring opening being adapted to a plurality of adapters of different tool holders, and in that each of the adapters to which the centring opening is adapted has on its top side a reference surface which is parallel to the table surface and whose distance from the table surface is the same for the adapters to which the centring opening is adapted.

25. Apparatus according to claim 1, wherein the induction coil unit comprises a magnetic-flux concentrator which at least partly screens that region of the rotary tool which is situated between the tool stop and the tool holder against the magnetic field of the induction coil unit.

26. Apparatus according to claim 4, wherein the positioning drive is designed as a controlled positioning drive which can be set to a selected position setpoint.

27. Apparatus according to claim 2, wherein the length-measuring device has a data output for length measurement data.

28. Apparatus according to claim 6, wherein the guide is rotatably mounted about its longitudinal direction on a foot fastened to the apparatus base.

29. Apparatus according to claim 6, wherein the arm is adapted to be swivelled about the displacement direction of the guide.

30. Apparatus according to claim 6, wherein the apparatus base forms a flat essentially horizontal table surface, on which the holder receptacle rests loosely in a freely displaceable manner.

31. Apparatus according to claim 30, wherein the holder receptacle has a circular outer contour, at least in its region facing the table surface, and in that at least three stops fixing the holder receptacle between them project beyond the table surface at a distance from one another on a circle, concentric to the induction coil unit, about the outer contour of the holder receptacle, of which stops two are rigid and at least one can be elastically deflected transversely to the table surface.

32. Apparatus according to claim 30, wherein a cooling device for the tool holder held in the holder receptacle is provided offset along the table surface, the holder receptacle being displaceable along the table surface in the vicinity of the cooling device.

33. Apparatus according to claim 30, wherein the holder receptacle, on its top side, has a centring opening for the concentric fixing of an adapter intended for accommodating a tool holder, the centring opening being adapted to a plurality of adapters of different tool holders, and in that each of the adapters to which the centring opening is adapted has on its top side a reference surface which is parallel to the table surface and whose distance from the table surface is the same for the adapters to which the centring opening is adapted.

34. Apparatus according to claim 6, wherein the induction coil unit comprises a magnetic-flux concentrator which at least partly screens that region of the rotary tool which is situated between the tool stop and the tool holder against the magnetic field of the induction coil unit.

* * * * *